Figure 1:
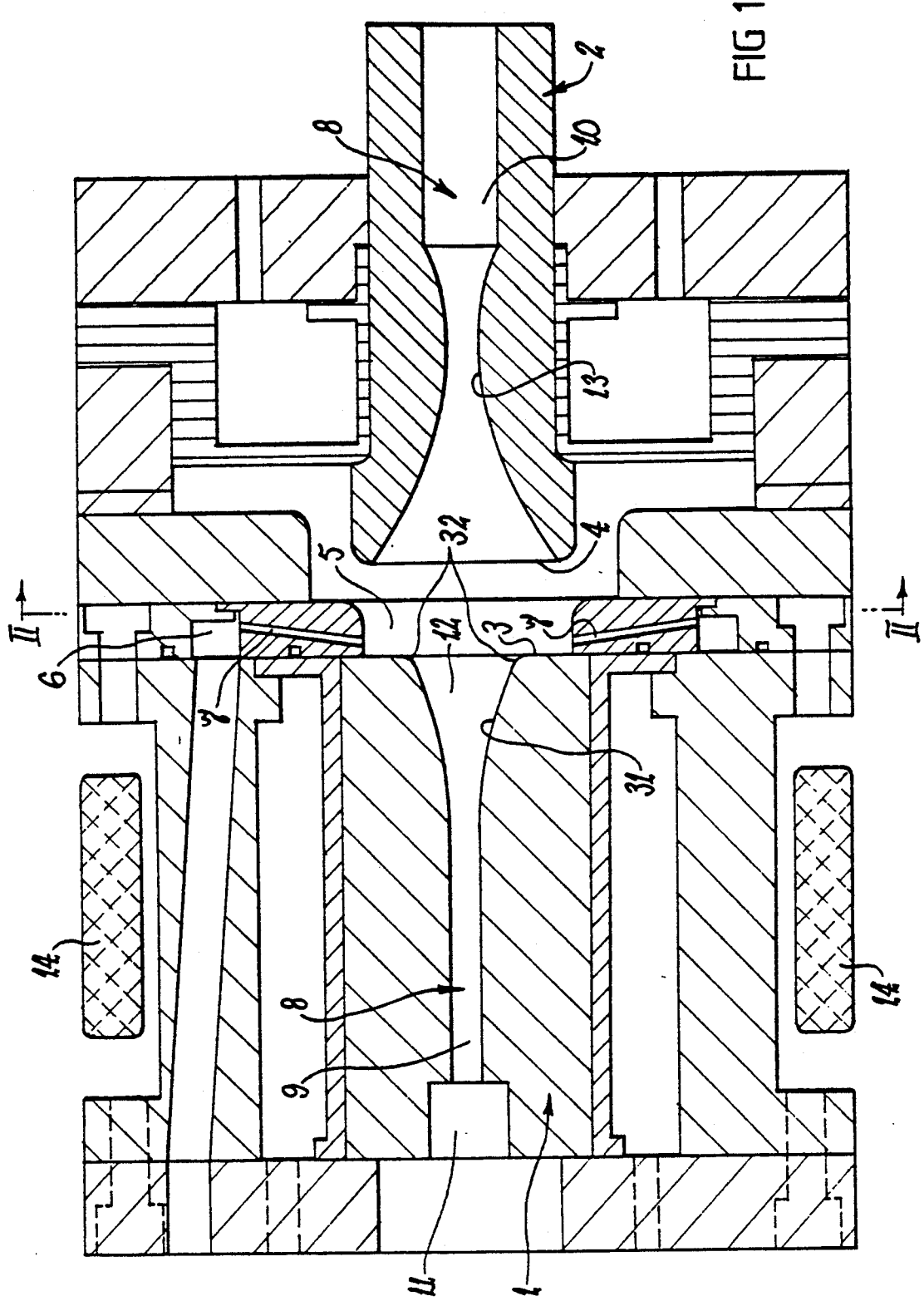

United States Patent [19]
Ramakrishnan et al.

[11] Patent Number: 5,296,672
[45] Date of Patent: Mar. 22, 1994

[54] ELECTRIC ARC REACTOR HAVING UPSTREAM AND DOWNSTREAM ELECTRODES

[75] Inventors: Subramania Ramakrishnan, Glen Waverly; Walter T. Oppenlander, deceased, late of Greensborough, by Gisela Hildgard Oppenlander, executor; Alan E. Mundy, Sunbury; Ian M. Ogilvy, North Balwyn, all of Australia

[73] Assignees: Commonwealth Scientific and Industrial Research Organisation, Campbell; Siddons Ramset Limited, Victoria, both of Australia

[21] Appl. No.: 602,281
[22] PCT Filed: May 17, 1989
[86] PCT No.: PCT/AU89/00216
§ 371 Date: May 21, 1991
§ 102(e) Date: May 21, 1991
[87] PCT Pub. No.: WO89/11775
PCT Pub. Date: Nov. 30, 1989

[30] Foreign Application Priority Data
May 17, 1988 [AU] Australia .................. PI8273

[51] Int. Cl.[5] .................................. B23K 9/00
[52] U.S. Cl. ................... 219/121.52; 219/121.49; 219/121.51; 219/121.48
[58] Field of Search ........... 219/121.49, 121.5, 121.51, 219/121.52, 121.39, 121.48, 74, 75; 313/231.21, 231.31, 231.41

[56] References Cited
U.S. PATENT DOCUMENTS

| | | | |
|---|---|---|---|
| 4,587,397 | 5/1986 | Camacho et al. | 219/121.48 |
| 4,668,853 | 5/1987 | Fey et al. | 219/121.49 |
| 4,891,490 | 1/1990 | Labrot | 219/121.52 |
| 5,004,888 | 4/1991 | Wolf et al. | 219/121.52 |
| 5,076,051 | 12/1991 | Naff | 219/121.51 |
| 5,147,998 | 9/1992 | Tsantrizos et al. | 219/121.5 |

*Primary Examiner*—Mark H. Paschall
*Attorney, Agent, or Firm*—Edward S. Irons

[57] ABSTRACT

An electric arc reactor having a substantially straight feed material passage extending through both the anode and the cathode. Gas is fed into the gap between the two electrodes so as to swirl about the axis of the feed passage and thereby confine the lateral extend of the arc and also confine the location at which the upstream arc root attaches to the upstream electrode. An enlargement of the passage in the gap end of the upstream electrode provides an internal sloping root attachment surface. A similar enlargement may be provided in the downstream electrode, but spaced from the gap, if the downstream electrode forms the cathode. Gas flow in a direction towards the upstream end of the feed passage is used to control the location at which an arc root attaches to the sloping surface of a passage enlargement. Magnetic means is provided to induce rotation of the arc such as to form a hollow arc column which is coaxial with the feed passage and through which feed material can pass.

30 Claims, 4 Drawing Sheets

ELECTRIC ARC REACTOR HAVING UPSTREAM AND DOWNSTREAM ELECTRODES

This invention is concerned with the generation of electric arc and is particularly concerned with electric arc reactors.

In the context of this specification an electric arc is to be understood as an electric discharge in a gaseous medium sustained between two electrodes by the passage of relatively large currents and characterised by low voltage drops at the cathode. The properties of the electric arc are influenced by a number of parameters such as the arc current, the fluid dynamics, the containment, the electrode material temperature and shape, the external magnetic fields (if used), and the gas in which the arc burns.

Electric arc reactors have the potential to generate high temperatures and for that reason have been proposed for use in furnaces and particularly furnaces intended for the destruction of noxious and toxic material. U.S. Pat. No. 3,832,519 (Westinghouse) is directed to an electric arc reactor which has been considered to be useful in a waste destruction plant. That prior reactor involves generation of an axial magnetic field between large tubular and co-axial electrodes, and the arc is rotated about the electrode axis so that the arc roots move in an approximately circular path. An advantage of that arrangement is that electrode wear is distributed over the surface of each electrode so that the life of the electrodes is increased.

A disadvantage of the Westinghouse reactor is that although material to be treated may be injected radially near the arc, an injection directly into the hot arc region is not achieved, and that reduces the effectiveness of the furnace. Furthermore, in accordance with conventional practice the material to be treated (feed material) is introduced downstream of the arc zone in a generally radial direction.

It is an object of the present invention to provide an electric arc reactor which involves rotation of the arc roots as in prior reactors, such as the Westinghouse reactor, but which is more effective in operation than those prior reactors. In particular, a reactor according to the invention is able to operate at relatively high power density levels whilst retaining a relatively low rate of electrode wear. It is a further object of the invention, in one form, to provide such a reactor which is of relatively compact form.

In accordance with the present invention, there is provided an electric arc reactor including, an upstream electrode and a downstream electrode which are connectable to a power source such as to enable an arc to be generated between them, a feed material passage extending in a substantially straight path through said electrodes and being connectable to a source of feed material at an injection end thereof, an electrode gap formed between adjacent inner ends of said electrodes which are spaced apart in the direction of said passage, said injection end being at an outer end of said upstream electrode remote from said gap, manifold means arranged to direct a flow of gas into said gap so as to confine the upstream root of a said arc to an exposed surface of said upstream electrode, and rotation inducing means whereby said arc is caused to rotate about the axis of said passage to create a hollow arc column through which feed material can pass.

Reference to "upstream" and "downstream" throughout this specification is to be understood in the context of the direction in which feed material flows through the aforementioned passage.

Rotation of the arc root results in production of a hollow ar column which is substantially coaxial with the feed passage, and the flow of gas within the gap across which the arc extends serves to confine the lateral extent of the arc column and also the location of the upstream root of the arc. Feed material is caused to move into and pass through the interior of that column and is thereby subjected to the hot core of the column.

It will generally happen that the flow of gas within the gap will cause the upstream root of the arc to attach to an internal surface of the portion of the passage extending through the upstream electrode. Indeed, the gas flow may be controlled to achieve that result. At high feed material flow rates, however, the upstream arc root may be pushed close to the inner end of that passage portion, and the root may move out of the passage to attach to the surface of the inner end of the upstream electrode.

Control of the location at which the upstream root attaches can be assisted if the aforementioned passage portion is enlarged at the inner end of the upstream electrode to form a sloping root attachment surface. The direction of slope is outwards from the passage axis and towards the gap. Such an arrangement also assists in minimising erosion of the electrode. It may be desirable to radius the junction between the enlargement and the inner end surface of the electrode so as to avoid generation of excessive temperature, and consequent erosion, if the upstream root is located at that junction.

The term "slope" or "sloping" as used throughout this specification is to be understood as embracing a slope along either a straight or a curved path.

Observations made of a reactor according to the invention in use, have failed to establish with certainty what happens to the arc root as it is caused to rotate. In particular, it is not clear whether the arc root remains as a single spot of attachment to the electrode surface as it moves across that surface, or whether the root splits to form several spots of attachment to that surface. It is also possible that the root diffuses to form a region of attachment, as distinct from a spot, or a substantially continuous ring of attachment. Reference to rotation of the arc root throughout this specification is to be understood as embracing all of those possibilities.

Furthermore, if the inducement to cause rotation of the arc root is applied predominantly to one end of the arc, rotation of the root at that end will in some cases promote rotation of the root at the other end of the arc. Such a consequence is to be inferred whenever there is reference in this specification to inducement of rotation of an arc root. If the circumstances are such that inducement applied to one root does not result in satisfactory rotation of the other, the inducement will need to be extended to have direct influence on both roots.

In many conventional electric arc reactors, at least one root of the arc attaches to an external surface of one of the electrodes, generally the cathode, which is usually of rod-like form. A reactor according to the present invention, in a preferred form, is arranged so that the arc attaches at each end to an internal surface of an electrode. It is further preferred that each of those internal surfaces is substantially co-axial with the feed material passage which extends through the electrodes.

As with conventional electric arc reactors, gas may be introduced into the arc zone to produce a satisfactory environment within which the arc can burn. Under some circumstances, that gas may also function as a fuel gas. In the reactor according to the invention, the gas which functions to confine the upstream arc of the root, as previously described, may also function to condition the arc environment as required and/or to fuel the arc. It is preferred that the confining gas is caused to swirl during its passage through the electrode gap, and to have an axial component of movement which is in a direction opposite to the direction of movement of feed material through the arc zone. It is found that such reverse flow tends to maintain the upstream root of the arc at a satisfactory location on the upstream electrode.

It has been known to induce a working gas vortex or gas tunnel within the arc zone of a conventional electric arc reactor. One such proposal is that of Arata as described in a variety of papers including "Fundamental Characteristics of Stationary Plasma Arc in Gas Tunnel" transactions of JWRI, Vol. 13, No. 2, 1984, page 1, "Application of a Gas Tunnel to High-Energy-Density Plasma Beams" Journal of Applied Physics, 59(9) May 1, 1986, page 3038, and "Characteristics of Gas-Tunnel Plasma-Sprayed Coatings", High Temperature Technology, Vol. 6, No. 1, Feb. 1, 1988, page 9.

The Arata gas tunnel serves to confine the arc column, but does not and is not intended to confine the location of a root of the arc. The upstream electrode of apparatus according to a preferred form of the present invention has an internal arc attachment surface, which may be formed by an enlargement of the feed material passage, and the apparatus employs a strong flow-plasma interaction directly at the arc root rather than further downstream of the column as in Arata. In particular, the Arata method does not stabilise the arc root.

In a preferred arrangement according to the present invention, an axial magnetic field is generated and applied to each root of the arc so as to cause, or at least assist in causing, rotation of the arc. The arrangement is such that each root of the arc is caused to rotate around the electrode surface to which it is attached, and the direction of that rotation is preferably the same as the rotational direction of the confining gas stream moving through the electrode gap.

The portion of the feed material passage within the downstream electrode is preferably configured to have a constriction at or adjacent the inlet end of that passage portion, which is the end adjacent the electrode gap. Under suitable conditions, it is found that the downstream root of the arc attaches to the passage wall downstream of the constriction, or at least downstream of the throat of the constriction which is the part of smallest cross-sectional size.

The extent to which the downstream root of the arc is pushed downstream depends upon the polarity of the electrodes. In the case of a downstream cathode, it may be necessary to take measures to control the downstream root location. By way of example, subjecting the downstream arc root to a stream of gas flowing in a direction opposite to the direction of feed material movement, may serve to create a stagnation zone inside the downstream electrode such as to determine the arc root location.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

Figure 2:
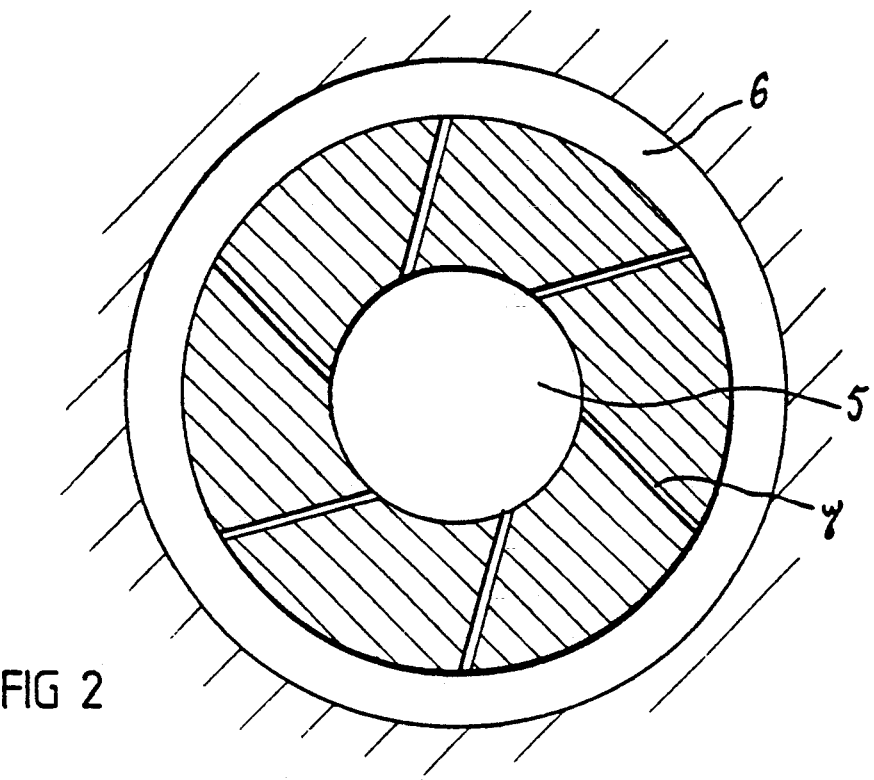
Figure 4:
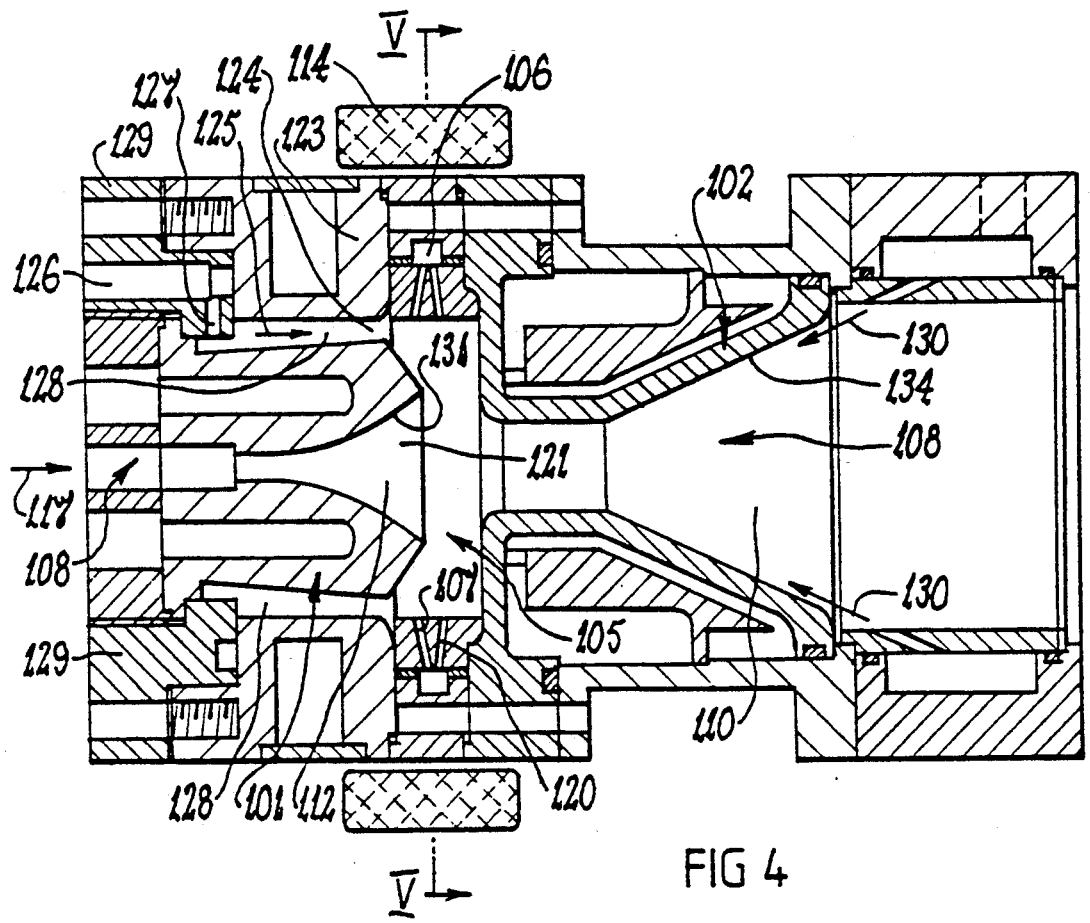
Figure 3:
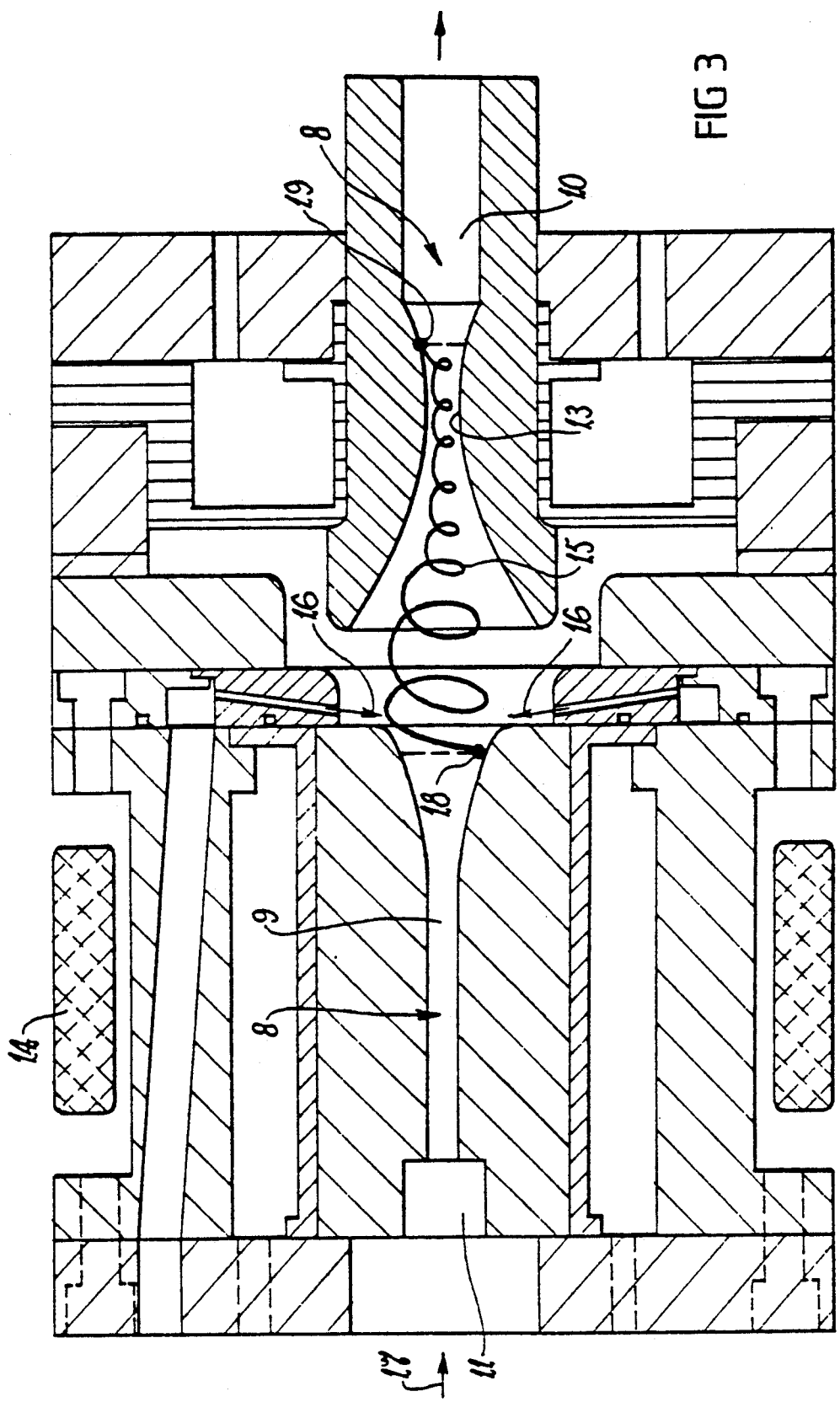
Figure 5:
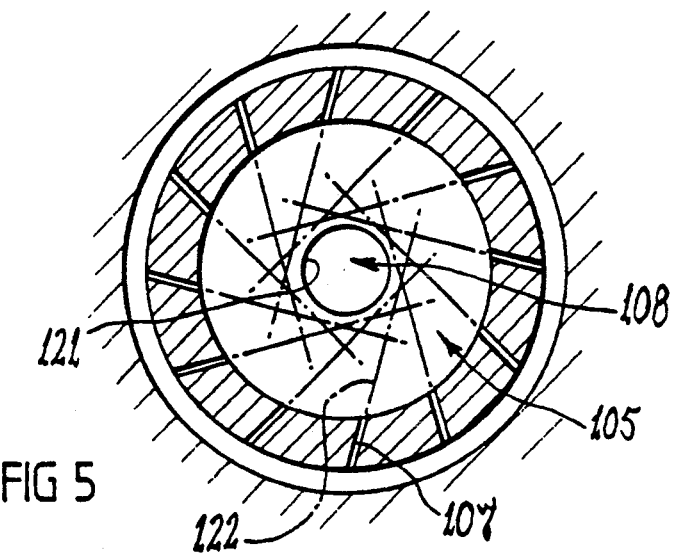
Figure 6:
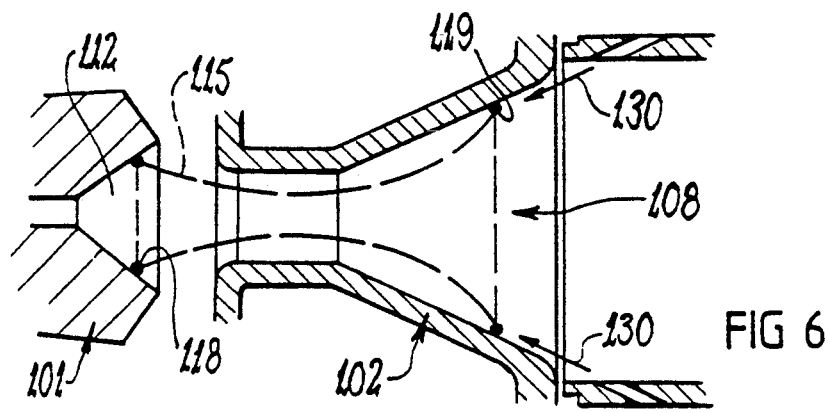
Figure 7:
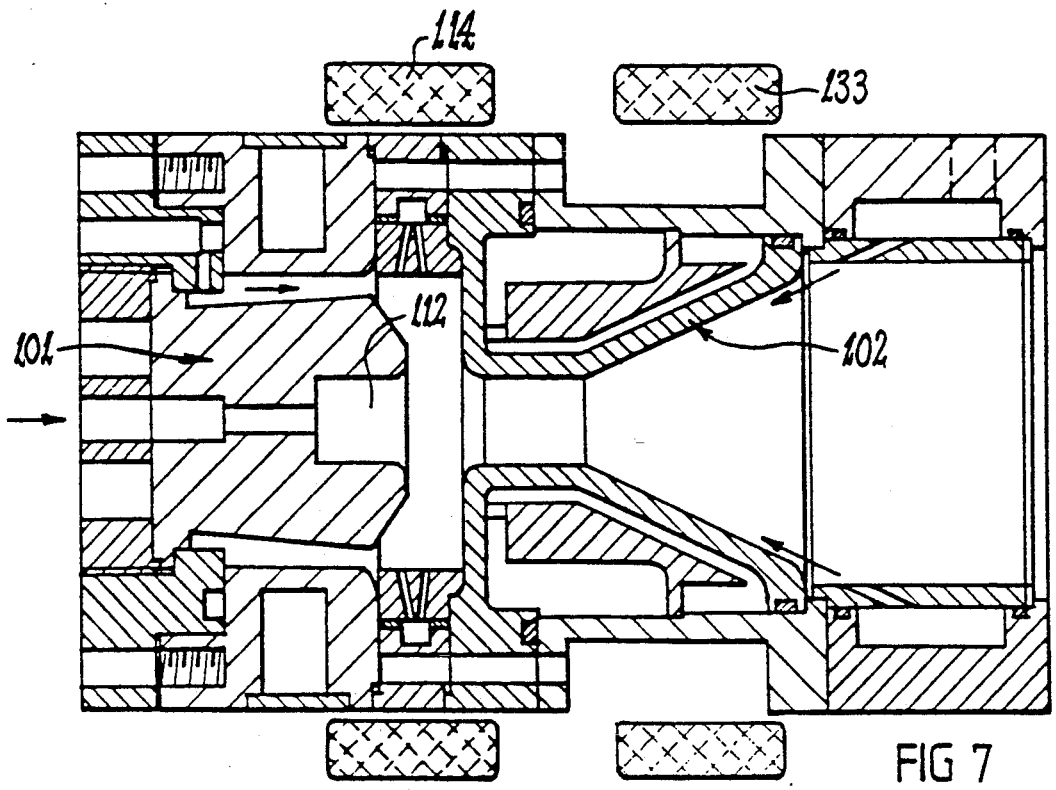

In the drawings:

FIG. 1 is a diagrammatic cross-sectional view of one form of reactor incorporating an embodiment of the invention, FIG. 2 is a cross-sectional view taken along line II—II of FIG. 1, and some parts are omitted from that view for convenience of illustration, FIG. 3 is a view similar to FIG. 1 but showing material and gas paths and the extent of the arc generated, FIG. 4 is a view similar to FIG. 1 but illustrating another form of reactor incorporating an embodiment of the invention, FIG. 5 is a view similar to FIG. 2 but taken along line V—V of FIG. 4, FIG. 6 shows part of the FIG. 4 reactor and the general form of the tubular arc column generated in such a reactor, FIG. 7 is a view similar to FIG. 4, but showing the use of two magnetic coils.

The particular reactor shown diagrammatically in FIG. 1 is arranged so that the upstream electrode 1 forms the cathode, and the downstream electrode 2 forms the anode. The adjacent inner ends 3 and 4 of those electrodes are spaced apart to form an electrode gap 5, the size of which can be determined to suit particular requirements. It is generally convenient to manufacture both the cathode 1 and the anode 2 so as to be of circular or substantially cylindrical form, and in that event the gap 5 is of generally circular form. Any suitable material can be used to construct the cathode 1 and anode 2 and that may be copper or carbon for example. It is usually necessary to provide appropriate cooling means (not shown) for the cathode 1 and/or anode 2.

A manifold 6 is connectable to a source of gas, which will be selected according to the intended function of that gas. In all cases, however, the gas will have a confining function as hereinafter described, and if that is its only function, it may be air for example. In other cases, the gas might have one or more additional functions, such as to condition the environment within which the arc is to exist, and/or to provide a fuel for the arc.

The manifold 6 is connected to the gap 5 through a number of passages 7 which are preferably arranged to function as swirl inducing means. In other arrangements, other means may be adopted for that purpose. The passages 7 are preferably arranged substantially as shown in FIG. 2, so as to induce a component of rotational movement in the body of gas contained in the gap 5. It is further preferred that the passages 7 slope inwards and upstream at a slight angle as shown in FIG. 1 so that the gas stream emerging from each passage 7 tends to move towards the end 3 of the cathode 1. The velocity of each gas stream emerging from the passages 7 can be selected to suit requirements, but a high velocity stream is generally preferred. Indeed, the stream could enter the gap 5 at supersonic speed.

An arrangement of the foregoing kind generates a strong swirling action in the gas contained within the gap 5. That swirling flow of gas has a confining and mixing effect on the arc and thereby improves the effectiveness of the reactor. The particular configuration shown in the drawings has been found to be very effective under certain conditions, including use of argon as the confinement gas. Other configurations may be required or preferred for other conditions of use.

A feed material passage 8 extends axially through both the cathode 1 and the anode 2. That is, the passage 8 is composed of two portions—a cathode or upstream portion 9 and an anode or downstream portion 10. An injection port 11 and an enlargement in the form of a cavity 12 are provided at respective opposite ends of the passage portion 9. The feed passage 8 need not be arranged as shown in all circumstances.

Although axial feed of material has been found to be highly beneficial in the reactor as shown, there may be circumstances under which it is desirable to use radial injection of feed material in addition to axial injection. A combination of axial injection and conventional downstream radial injection offers the possibility of spraying composite powders where the components have significantly differing melting points. For example, ceramic-metal composites or metal-polymer composites. The higher melting component might be injected axially through the arc and the lower melting component would then be injected radially downstream. Auxiliary radial feed might also be used in circumstances where the feed material is metal ore, or where there was seen to be an advantage in adding to the body of feed material at a location or locations downstream of the cathode 1 or the anode 2.

The cavity 12 is preferably of conical or trumpet form as shown so as to provide a sloping root attachment surface 31, and is dimensioned to suit the particular circumstances of use. The configuration and size of the cavity 12 for a particular application of the reactor can be determined by trial and error to optimise heat load and material—arc interaction. It is generally preferred that a radius 32 be provided at the junction between the surface 31 and the transverse surface at the inner end 3 of the cathode 1.

The passage portion 10 which extends axially through the anode 2 has a constriction 13 which is located towards the upstream end of that passage portion. As shown, the passage portion 10 progressively reduces in size in a direction downstream towards the throat of the constriction 13 and progressively increases in size on the downstream side of the throat of the constriction 13. Other arrangements are clearly possible.

Magnetic means 14 is operable to generate an axial magnetic field which is applied in the region of the cathode cavity 12. That magnetic field causes, or at least assists in causing, the arc to rotate about the axis of the passage 8 and thereby create a hollow arc column through which feed material can pass. It is possible, however, that such rotation of the arc can be caused or influenced by convection currents within the core of the reactor, or by other means hereinafter broadly identified as rotation inducing means.

FIG. 3 shows, in diagrammatic form, the way in which the arc 15 is formed. Confining gas enters the gap 5 as shown by the arrows 16 and is caused to flow around the gap 5 in a swirling fashion for reasons previously described in connection with FIG. 2. That flow of gas has an axial component in a direction towards the enlargement 12, as shown by FIG. 3, and that is a direction counter to the direction of flow of feed material through the passage 8, as depicted by the arrow 17.

The flow of gas within the gap 5 has the effect of creating a stagnant area within the enlargement 12 and thereby confining the upstream root 18 of the arc 15 to attachment to the internal surface of the enlargement 12. It is generally preferred to arrange the system such that the root 18 remains close to the end 3 of the cathode 1 rather than further upstream of the enlargement 12.

The downstream root 19 of the arc 15 attaches within the passage portion 10, and the constriction 13 serves to confine the radial extent of the arc 15 and that has a benefit as is hereinafter discussed.

Energisation of the magnetic means 14 generates an axial magnetic field which causes, or at least contributes to causing, the arc roots 18 and 19 to rotate, preferably in the direction of rotation of the gas swirling within the gap 5. It has been observed that the arc roots 18 and 19 rotate at a very high speed and there is presently some uncertainty as to whether there is a single rotating spot at the electrode surfaces, or a plurality of such spots, or a ring-shaped arc attachment. The ring-shaped attachment might be continuous or discontinuous.

Feed material will generally bounce off the body of an arc, and consequently a continuous or substantially continuous arc ring at the internal surface of the enlargement 12 inhibits movement of feed material along that surface. The feed material introduced through the port 11 is therefore caused to move into the core of the rotating arc column 15 and be thereby subjected to the full influence of the arc 15.

Reduction of the feed material to a waste product such as gas will generally occur within the region bridging between the enlargement 12 and the constriction 13. The axial injection of the feed material and the stabilising influence of the swirling confinement gas and also the constriction 13 ensure that the waste product goes to the core of the arc 15 for maximum effectiveness of the treatment process. The feed material mixes with the confinement gas at the upstream end of the enlargement 12. Because of the rotation of the arc root 18 around the internal surface of the enlargement 12, a vortex is created within that enlargement and the feed material and gas stream is thereby caused to move axially into the core of the arc 15.

FIG. 4 illustrates, diagrammatically, another form of reactor according to the invention. Components of that embodiment which correspond to components of the FIG. 1 embodiment will be given like reference numerals except that they will be in the number series 100-199.

The reactor of FIG. 4 is arranged so that the upstream electrode 101 forms the anode and the downstream electrode 102 forms the cathode. That is, the polarity is the reverse of that adopted in the FIG. 1 embodiment.

Another difference exists in that there are two groups of passages 107 and 120 connecting the gas manifold 106 to the gap 105. The first group is arranged substantially as described in connection with the passages 7 of the FIG. 1 embodiment except that in a preferred arrangement each passage 107 has a particular relationship with the circular mouth 121 of the enlargement 112. In particular, it is preferred that the longitudinal axis 122 of each passage 107, if extended as shown in FIG. 5, is substantially tangential to the mouth 121. Such a relationship may not be preferred in some circumstances, but has been found to be beneficial in the arrangement shown in FIGS. 4 and 5.

The passages 120 may be arranged generally the same as the passages 107 except that each is slightly inclined away from the adjacent end of the anode 101 as seen in FIG. 4.

A section of the passage portion 110 is enlarged as shown to provide a sloping arc attachment surface 134 which is spaced from the gap 105 in the axial direction of the passage 108. The passage 108 of the FIG. 4 arrangement therefore has two enlargements, 112 and that which forms the surface 134, and each provides a root attachment surface.

It is a feature of the arrangement shown in FIG. 4 that the member 123 which surrounds the anode 101, has cathode potential. At the commencement of operation of the reactor, a pilot arc is struck in the region 124 between the anode 101 and the member 123. An auxiliary gas flow in the direction of arrow 125 is then used to push the pilot arc towards and into the gap 105. The auxiliary gas flow is effected, in the arrangement shown, through interconnected passages 126, 127 and 128.

Flow of the confining gas through passages 107 and 120 is preferably commenced after the pilot arc is subjected to the influence of the auxiliary gas flow. The confining gas flow then functions to move the arc into its operational location and condition at which its opposite roots are attached to the internal surfaces of the enlargement 112 and the cathode 102 respectively as shown diagrammatically by FIG. 6. The auxiliary gas flow is terminated after the arc is placed under the influence of the confining gas flow.

The passage 126 is, in the arrangement shown, formed in an insulating member 129 which is located so as to be substantially shielded from direct illumination by the arc when the arc is at its operational location and condition as shown in FIG. 3. That shielding is effected at least in part by the member 123, which is preferably water cooled.

Presence of the water cooled member 123 has the further advantage of enabling the confining gas manifold 106 to be located closer to the arc and thereby improve the confining function of the gas flow.

Means may be provided to enable control of the location at which the downstream root of the arc attaches to the internal surface of the cathode 102. In the arrangement shown, that is achieved by a flow of gas as depicted by the arrows 130 in FIG. 4, which enters the downstream end of the cathode passage portion 110 and flows in a direction towards the upstream end of that passage portion. Such flow tends to create a stagnant area within the passage portion 110 which determines the arc root location. The flow rate can be selected to suit requirements.

It has been found beneficial to use two magnetic coils for the rotation inducing means, and such an arrangement is shown in FIG. 7. The FIG. 7 apparatus is as shown in FIG. 4 except that a second coil 133 has been added, and the cavity 112 is cylindrical rather than conical. The coil 133 is located around the cathode 102 and will have a polarity opposite to that of the coil 114 to ensure that both ends of the arc 115 rotate in the same direction.

Any of the described embodiments of the invention can be modified by inclusion of a second magnetic coil, and/or by use of a passage enlargement having a shape other than conical.

It will be appreciated from the foregoing description that the invention provides an effective and unique electric arc reactor. The reactor can be constructed so as to be relatively compact and may be incorporated in a mobile waste destruction unit. The reactor has the further advantage of being usable with feed materials in liquid, gas, or particulate form, whereas many prior reactors are not usable with particulate material. Another advantage of this reactor is that it can be used in the area of plasma spraying wherein the injected material is in the form of powders which require an efficient melting to produce a coating. It is a particular feature of the reactor that it enables a higher degree of control over arc activity at the cathode end and over the form and location of the arc column. In the particular example described the arc column is in the form of a helix which rotates at high speed.

Various alterations, modifications and/or additions may be introduced into the constructions and arrangements of parts previously described without departing from the spirit or ambit of the invention as defined by the appended claims.

We claim:

1. An electric arc reactor including, an upstream electrode and a downstream electrode which are connectable to a power source such as to enable an arc to be generated between them, a feed material passage extending in a substantially straight path through said electrodes and being connectable to a source of feed material at an injection end thereof, an upstream portion of said feed passage extending through said upstream electrode, an electrode gap formed between adjacent inner ends of said electrodes which are spaced apart in the direction of said passage, said injection end being at an outer end of said upstream passage portion remote from said gap, rotation inducing means whereby said arc is caused to rotate about the axis of said passage to create a hollow arc column through which feed material can pass, and manifold means arranged to direct a flow of gas into said gap so that a component of said flow is in a direction towards said injection end and said gas enters said upstream passage portion at the inner end of said upstream electrode to flow along an inner surface of said upstream electrode, whereby in use the flow along said inner surface is counter to the flow of said feed material and a stagnation zone is thereby created at said inner surface, and the upstream root of said arc is confined to attachment to said inner surface at said stagnation zone.

2. A reactor according to claim 1, wherein said gap forms at least part of a chamber which has a transverse cross-sectional size greater than that of said feed passage.

3. A reactor according to claim 1, wherein the direction of said gas flow component is substantially parallel to said inner surface.

4. A reactor according to claim 1, wherein the interaction of said gas flow and axial flow of feed material through said passage produces said stagnation zone and upstream passage portion is arranged to promote location of said stagnation zone adjacent the downstream end of said upstream passage portion.

5. A reactor according to claim 4, wherein an enlargement of said passage is provided within said upstream passage portion and communicates with said gap through an open mouth at said inner end of the upstream electrode, and said stagnation zone is formed in said enlargement adjacent said mouth.

6. A reactor according to claim 5, wherein said enlargement progressively increases in size towards said gap to provide a sloping root attachment surface.

7. A reactor according to claim 5, wherein said mouth is defined by a curved surface forming a junction between said enlargement and the surface of said inner end of the upstream electrode.

8. A reactor according to claim 1, wherein said gap is formed by a generally circular space which is substantially coaxial with said feed material passage, an enlargement is formed in said passage at said inner end of the upstream electrode, and said enlargement communicates with said gap through a generally circular mouth which is also substantially coaxial with said feed material passage.

9. A reactor according to claim 8, wherein said manifold means includes a plurality of manifold passages each of which communicates with a radially outer region of said gap in such a way as to direct a stream of said gas into said gap along a path which extends generally towards the axis of said feed material passage but does not intersect with that axis.

10. A reactor according to claim 9, wherein the path of each said stream is in a direction substantially tangential to the periphery of said circular mouth.

11. A reactor according to claim 9, wherein each said stream is in the form of a high velocity jet.

12. A reactor according to claim 7, wherein there are two groups of said manifold passages, the path of each said stream of one said group is slightly inclined toward said inner end of the upstream electrode, and the path of each said stream of the other said group is slightly inclined towards said inner end of the downstream electrode.

13. A reactor according to claim 8, wherein said internal surface provides a root attachment surface which slopes outwardly from the axis of said passage in a direction away from said injection end.

14. A reactor according to claim 1, wherein said upstream electrode forms a cathode and said downstream electrode forms an anode.

15. A reactor according to claim 1, wherein said upstream and downstream electrodes form an anode and a cathode respectively, an enlargement of said passage is formed with said cathode and progressively increases in size in a direction away from said injection end so as to provide a sloping arc root attachment surface.

16. A reactor according to claim 15, wherein backflow means is provided for directing a flow of gas into said enlargement in a direction towards said injection end so as to produce a stagnation zone within the enlargement and thereby promote attachment of a said arc root to said attachment surface at that zone.

17. A reactor according to claim 15, wherein a starting electrode is provided around an inner end portion of said anode, said starting electrode and said anode are connectable to a power source to enable a pilot arc to be generated between said starting electrode and an external surface of said anode at commencement of operation of said reactor, and arc re-positioning means is provided to cause said pilot arc to migrate into said gap and to be transformed into an arc having the opposite roots thereof attached to surfaces of the anode and the cathode respectively.

18. A reactor according to claim 17, wherein said arc re-positioning means includes passage means for directing an auxiliary flow of gas towards said gap through the region at which said pilot arc is formed.

19. A reactor according to claim 17, wherein said manifold means forms part of said arc re-positioning means in that said flow of gas from the manifold means assists said transformation of the pilot arc.

20. A reactor according to claim 1, wherein one of said electrodes forms an anode and the other forms a cathode, and control means is provided for controlling the location oat which one root of a said arc attaches to a surface of said cathode.

21. A reactor according to claim 20, wherein said control means includes means for producing a flow of gas into the said passage so as to create a stagnation zone within said cathode at the desired location for attachment of said one root.

22. A reactor according to claim 21, wherein said control means includes an enlargement of the passage within said cathode and which progressively increases in size in a direction away from said injection end to form a sloping root attachment surface, and said control means gas flow is in a direction generally towards said injection end.

23. A reactor according to claim 22, wherein said upstream electrode forms said anode, said downstream electrode forms said cathode, and said enlargement is spaced from said gap in the axial direction of said passage.

24. A reactor according to claim 23, wherein a further said enlargement of said passage is provided within the inner end of said upstream electrode, and said further enlargement progressively increases in size towards said gap to provide a sloping root attachment surface.

25. A reactor according to claim 1, wherein said manifold means is arranged to direct a plurality of streams of gas into said gap so as to confine the lateral extent of said arc.

26. A reactor according to claim 1, wherein said manifold means is arranged to cause said gas to swirl about the axis of said passage as it flows through said gap.

27. A reactor according to claim 1, wherein said rotation inducing means is formed at least in part by said manifold means.

28. A reactor according to claim 1, wherein said rotation inducing means includes magnetic means operable to generate a magnetic field which at least assists said rotation.

29. A reactor according to claim 28, wherein said magnetic means includes two magnetic coils each of which is associated with a respective one of said electrodes, and each said coil has an opposite polarity.

30. A reactor according to claim 1, wherein a constriction is provided in the portion of said feed material passage which extends through said downstream electrode, and said constriction is located adjacent said inner end of the downstream electrode.

* * * * *